(12) United States Patent
Dua et al.

(10) Patent No.: US 8,942,331 B2
(45) Date of Patent: Jan. 27, 2015

(54) APPARATUS AND METHOD FOR IMPROVING THE PERFORMANCE OF A LINEAR EQUALIZER WITH MULTIPLE RECEIVE ANTENNAS

(71) Applicant: QUALCOMM Incorporated, San Diego, CA (US)

(72) Inventors: Aditya Dua, San Jose, CA (US); Nate Chizgi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/757,553

(22) Filed: Feb. 1, 2013

(65) Prior Publication Data
US 2014/0016689 A1     Jan. 16, 2014

Related U.S. Application Data (60) Provisional application No. 61/670,929, filed on Jul. 12, 2012.

(51) Int. Cl.
| | |
|---|---|
| *H04B 7/10* | (2006.01) |
| *H04L 27/01* | (2006.01) |
| *H04B 7/08* | (2006.01) |
| *H04L 25/02* | (2006.01) |

(52) U.S. Cl.
CPC .............. *H04L 27/01* (2013.01); *H04B 7/0845* (2013.01); *H04B 7/0854* (2013.01); *H04L 25/0204* (2013.01)
USPC ........................................................ 375/347

(58) Field of Classification Search
CPC .. H04L 27/01; H04L 25/0204; H04B 7/0845; H04B 7/0854

USPC ......... 375/148, 219, 224, 229, 230, 260, 267, 375/346, 347, 350, 232; 455/132, 136, 138, 455/232.1, 278.1
See application file for complete search history.

(56) References Cited

U.S. PATENT DOCUMENTS

| | | | |
|---|---|---|---|
| 5,875,216 A | * | 2/1999 | Martin .......................... 375/347 |
| 7,266,355 B2 | | 9/2007 | Diloisy |

(Continued)

FOREIGN PATENT DOCUMENTS

| | | |
|---|---|---|
| WO | 9842089 A2 | 9/1998 |
| WO | 2010072893 A1 | 7/2010 |

OTHER PUBLICATIONS

International Search Report and Written Opinion—PCT/US2013/049326—ISA/EPO—Oct. 15, 2013.

*Primary Examiner* — Syed Haider
(74) *Attorney, Agent, or Firm* — Charles Chesney (57) ABSTRACT

Disclosed are methods and apparatus for initializing an equalizer in a diversity receiver. In one aspect, the initialization includes estimating a channel impulse response (CIR) for each receiver chain of the diversity receiver; determining noise power estimates for each receiver chain based on the CIRs; and adaptively adjusting equalizer taps of each receiver chain based on the noise power estimates. In one aspect, the adaptive adjusting of the equalizer taps is based on scaling the CIR and covariance metrics for the receiver chain with higher noise power by a scale factor determined from the noise power estimates. In another aspect, the adaptive adjusting of the equalizer taps is based adaptive conditioning on the diagonal of the covariance matrix.

24 Claims, 8 Drawing Sheets

(56) References Cited

U.S. PATENT DOCUMENTS

| | | |
|---|---|---|
| 8,189,653 B2 | 5/2012 | Luschi et al. |
| 8,254,509 B2 | 8/2012 | Umeda et al. |
| 2004/0125898 A1* | 7/2004 | Ariyavisitakul et al. ..... 375/347 |
| 2005/0282509 A1* | 12/2005 | Khayrallah ................... 455/136 |
| 2006/0072449 A1 | 4/2006 | Kent et al. |
| 2007/0071150 A1* | 3/2007 | Yang et al. .................... 375/347 |
| 2009/0180455 A1 | 7/2009 | Ranganathan et al. |
| 2009/0316762 A1* | 12/2009 | Pan et al. ....................... 375/148 |
| 2010/0027702 A1* | 2/2010 | Vijayan et al. ................ 375/267 |
| 2011/0249779 A1* | 10/2011 | Miao et al. .................... 375/347 |
| 2012/0140808 A1 | 6/2012 | Dua et al. |

\* cited by examiner

APPARATUS AND METHOD FOR IMPROVING THE PERFORMANCE OF A LINEAR EQUALIZER WITH MULTIPLE RECEIVE ANTENNAS

CLAIM OF PRIORITY UNDER 35 U.S.C. §119

The present application for patent claims priority to Provisional Application No. 61/670,929 entitled "Apparatus and Method for Improving the Performance of a Linear Equalizer with Multiple Receive Antennas" filed on Jul. 12, 2012, and assigned to the assignee hereof and hereby expressly incorporated by reference herein.

BACKGROUND

1. Field

Aspects of the present disclosure relate generally to wireless communication systems, and more particularly, to an apparatus and method for improving the performance of a linear equalizer with multiple receive antennas.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Downlink Packet Access (HSDPA) is a data service offered on the downlink of W-CDMA networks.

The downlink performance of HSDPA capable user equipment (UE) can be improved significantly by employing a chip level equalizer to combat the frequency selective behavior of the wireless channel. The performance of an equalizer receiver can be improved even further by employing multiple receive antennas (Rx diversity or RxD) at the UE to exploit spatial diversity. A typical HSDPA equalizer architecture (with Rx diversity) comprises of two linear filters (one for each receive chain), the coefficients for which are computed based on the criterion of minimizing mean squared error between the transmitted and received chip level signals. The signals received at the two receive antennas are processed with independent automatic gain control (AGC) circuits and stored in two different sample buffers for further processing. The AGC circuits for the two receive chains are operated independently in order to minimize the impact of quantization noise on each Rx individually. The computation of the equalizer taps involves the inversion of the received signal covariance matrix. In order to make the inversion robust, the covariance matrix may be "conditioned" or "regularized" by augmenting its diagonal with a non-zero term. However, in the presence of independent AGC circuits, covariance matrix conditioning degrades equalizer performance in scenarios where the two receive antennas experience a significant power differential or imbalance (e.g. due to physical phenomena like channel fading and shadowing or even due to the user's grip on her phone, which may block one of the antennas).

Accordingly there is a need to improve performance of a linear equalizer in a receiver of a HSDPA enabled UE having multiple receive antennas.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed herein are an apparatus and methodologies for improving the performance of a linear equalizer with multiple receive antennas. Generally, the disclosed methodology for Adaptive RxD Combining (ARC) "undoes" the effect of the unequal AGC gains applied to the two or more receive chains adaptively over time, based on the estimates of post-AGC noise powers. The ARC methodology improves downlink UE throughput by up to 30% in scenarios which could be experienced in real world HSDPA deployments. The low computational complexity of the ARC methodology, in conjunction with the performance benefits, makes it very attractive for system-on-chip (SoC) implementations common to modern UEs. In addition, the ARC methodology is not limited to W-CDMA systems, but can be readily applied to other wireless communications technologies, such as TD-SCDMA, 1x, LTE, etc.

In one aspect, the disclosure provides a methodology for initializing an equalizer in a diversity receiver, the methodology comprising: estimating a channel impulse response (CIR) for each receiver chain of the diversity receiver; determining noise power estimates for each receiver chain based on the CIRs; and adaptively adjusting equalizer taps of each receiver chain based on the noise power estimates. In one aspect, the adaptive adjusting of the equalizer taps is based on scaling the CIR and covariance metrics for the receiver chain with higher noise power by a scale factor determined from the noise power estimates. In another aspect, the adaptive adjusting of the equalizer taps is based adaptive conditioning on the diagonal of the covariance matrix.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As a background, the problem of (jointly) computing the linear minimum mean squared error (LMMSE) chip level equalizer taps with two receive antennas will be formulated first. This formulation ignores several implementation related details, but captures the essence of the problem and is sufficient to describe the methodologies for improving performance of a linear equalizer which will be described below with referenced to FIG. 1 which illustrates a schematic diagram of an example diversity W-CDMA receiver 10. The following notation will be used to facilitate the description:

x(n): Denotes chips sequence transmitted by the NodeB (base station)

hi(k): Denotes kth tap of wireless channel (aka channel impulse response or CIR) from the transmit antenna at the NodeB to the ith receive antenna, i∈{0, 1} yi(n): Denotes post-AGC chips sequence received at the ith receive antenna, i∈{0, 1} wi(n): Denotes additive thermal noise+interference at the ith receive antenna (zero mean, variance σi2)

ci(j): Denotes jth tap of the equalizer used to process the signal received at the ith receive antenna gi: Denotes AGC gain applied to the signal received at the ith receive antenna K: Denotes number of taps (per antenna) in the wireless channel (delay spread)

J: Denotes number of taps (per antenna) in the equalizer used at the UE $\vec{f}$: Denotes the vector f $(.)^*$: Denotes the complex conjugate of a quantity $(.)^H$: Denotes the Hermitian (conjugate transpose) of a matrix.

Figure 1:
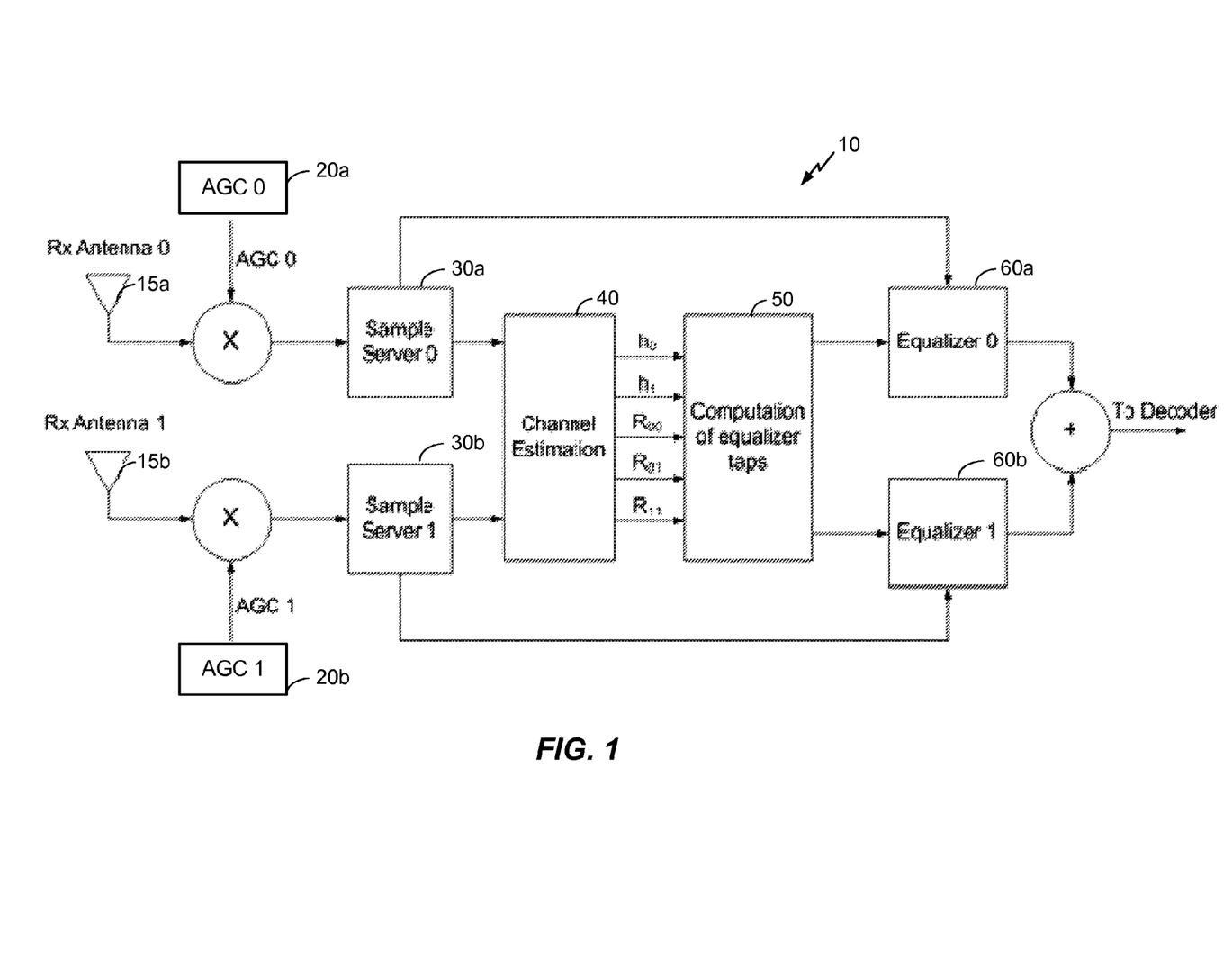
FIG. 1 is a block diagram illustrating an example of a diversity W-CDMA receiver.

With the above notation, the chip level received signal at the $i^{th}$ receive antenna can be written as:

$$y_i(n) = \sum_{k=0}^{K-1} g_i h_i(k) x(n-k) + g_i w_i(n) \quad \text{Equation 1}$$

The estimate of the $p^{th}$ transmitted chip at the output of the receiver 10 may be given by:

$$\hat{x}(p) = \sum_{j=0}^{J-1} c_0(j) y_0(p+j) + \sum_{j=0}^{J-1} c_1(j) y_1(p+j) \quad \text{Equation 2}$$

The LMMSE equalizer taps may be computed such that the following mean-squared error objective function is minimized:

$$E[|x(p)-\hat{x}(p)|^2] \quad \text{Equation 3}$$

Using known analysis techniques, the LMMSE equalizer taps can be computed as follows:

$$\vec{c}_{MMSE} = \begin{bmatrix} \vec{c}_0 \\ \vec{c}_1 \end{bmatrix} = \underbrace{\begin{bmatrix} R_{00} & R_{01}^H \\ R_{01} & R_{11} \end{bmatrix}}_{R}^{-1} \underbrace{\begin{bmatrix} \vec{h}_0^* \\ \vec{h}_1^* \end{bmatrix}}_{\vec{h}} \quad \text{Equation 4}$$

or in shorthand, $\vec{c}_{MMSE} = R^{-1} \vec{h}$. In the Equation 4, $R_{00}$ is the J×J auto-covariance matrix for the primary receive antenna, $R_{11}$ is the J×J auto-covariance matrix for the diversity receive antenna, and $R_{01}$ is the J×J cross-covariance matrix between the primary and diversity receive antennas. In one aspect, auto-covariance matrixes $R_{00}$, $R_{11}$ and $R_{01}$ can be represented in the following manner $$R_{00}(i,j) = E[y^*_0(i) y_0(j)], R_{11}(i,j) = E[y^*_1(i) y_1(j)],$$
$$R_{01}(i,j) = E[y^*_0(i) y_1(j)], i,j \in \{0,1,\ldots,31\} \quad \text{Equation 5}$$

The covariance matrix R is not guaranteed to be invertible. Sometimes, even if the matrix R is invertible, numerical instability may arise (in finite precision implementation) if the matrix has eigen-values close to 0, resulting in degradation of equalizer performance. One potential way of making the matrix inversion operation more robust is to condition or augment the diagonal of the covariance matrix with non-zero terms. In particular, the LMMSE equalizer taps with covariance matrix conditioning are computed as:

$$\vec{c}_{MMSE-Cond} = (R+\lambda I)^{-1} \vec{h} \quad \text{Equation 6}$$

where I denotes the 2J×2J identity matrix and λ>0 is a design parameter. Conditioning the diagonal of the covariance matrix is not an ad hoc choice. In fact, it can be shown that the equalizer taps in the equation above are the solution to a regularized minimum mean squared error problem with the modified objective function:

$$E[|x(p)-\hat{x}(p)|^2 + \lambda \|\vec{c}\|^2] \quad \text{Equation 7}$$

Adding λ to the diagonal of matrix R has the impact of adding a strictly positive term λ to all the eigen-values of R, thereby improving the stability properties of the matrix inverse. There are no precise rules for selecting the value of the parameter λ. In one aspect, λ=aTr(R), where Tr(.) denotes the trace operation (sum of the terms on the diagonal of the matrix) and a ∈(0,1] is a design parameter referred to as the conditioning coefficient. It can be seen that Tr(R)=J[$R_{00}$(0)+$R_{11}$(0)]. Based on results of simulations and experiments, a=⅛J in one aspect of equalizer implementation.

Again returning to the description of operation of the UE receiver 10 in FIG. 1, the wireless signal received over the air by RF antennas 15a and 15b. The received signals are sampled, digitized, and stored in finite precision in sample buffers 30a and 30b associated with each of the antennas for further processing. To account for the fluctuations in received signal level (e.g. due to wireless channel fading), the digitized samples are processed with AGC circuits 20a and 20b before being written to the sample buffers 30a and 30b. AGC circuits 20 ensure roughly constant output signal power for a wide range of input signal powers. The AGC 20 is designed to maximize a signal to quantization noise ratio (SQNR) for the digitized samples. Since the wireless signals received at the two RF antennas 20 experience independent fluctuations in amplitude/power, they have independent, dedicated AGC circuits 20a and 20b. This design ensures that the SQNR on each receive chain is individually maximized.

The digitized signals stored in the sample buffers 30a and 30b for each Rx chain are then sent to the channel estimator 40, which may include a RAKE receiver (not shown), for determining various channel estimates, such as channel impulse response (CIR) h for each Rx antenna 15, and auto-covariance matrixes $R_{00}$, $R_{01}$ and $R_{11}$. These channel parameters are then passed to the equalizer tap computation module 50, which computes appropriate equalizer tap settings for equalizers 60a and 60b of each receiver chain based on provided channel estimates. The computation of the equalizer taps by module 50 generally involves the inversion of the received signal covariance matrix. Equalizers 60 use filters therein to mitigate the frequency selective behavior of the wireless channel. The output filtered signals of the equalizers 60a and 60b are added and sent to the decoder (not shown) for decoding and further processing.

It should be noted that AGCs 20a and 20b effectively introduces a scaling or gain on the signal datapath. Since each receiver chain (e.g., 15a, 20a, 30a, 60a and 15b, 20b, 30b, 60b) has its own AGC circuit, the two datapaths can potentially experience different gains due to RF channel variations. This fact does not impact the LMMSE solution without covariance matrix conditioning). However, the regularized LMMSE solution (with covariance matrix conditioning) is sub-optimal under independent AGC design. The degradation is most noticeable in scenarios where the AGC gains on the two receive chains are highly disparate, which refers as Rx imbalance. Rx imbalance can occur on different time scales (ranging from a few milliseconds to a several seconds) and can be attributed to different reasons. For example, short term imbalance (order of milliseconds) could occur due to wireless channel fading on one of the RF antennas. Long term imbalance (order of seconds) could occur due to shadowing, attributed to the orientation of the UE or the user's grip on the UE. In addition, imbalance could also be caused by asymmetric antenna design. For instance, to keep the cost of the UE low, the diversity antenna may be cheaper and not as good as the primary receive antenna.

To address the performance degradation caused by covariance matrix conditioning in the presence of unequal AGC gains, provided herein a methodology for "undoing" the effect of the unequal AGC gains, without reducing the SQNR on either of the receive chains. Instead of the computing the linear MMSE equalizer taps as described in Equation 6, the equalizer taps may be computed using a new adaptive RxD combining (ARC) methodology. The basic idea behind the new ARC is to compensate for the unequal AGC gains applied to the two receive chains by scaling down the channel estimates and equalizer taps for the receive chain Rx with higher post-AGC noise power. The ARC methodology adaptively determines the relative combining weights for the channel estimates and equalizer taps for the two or more receive chains (e.g., based on the ratio of noise powers observed on the two Rx chains).

Figure 2:
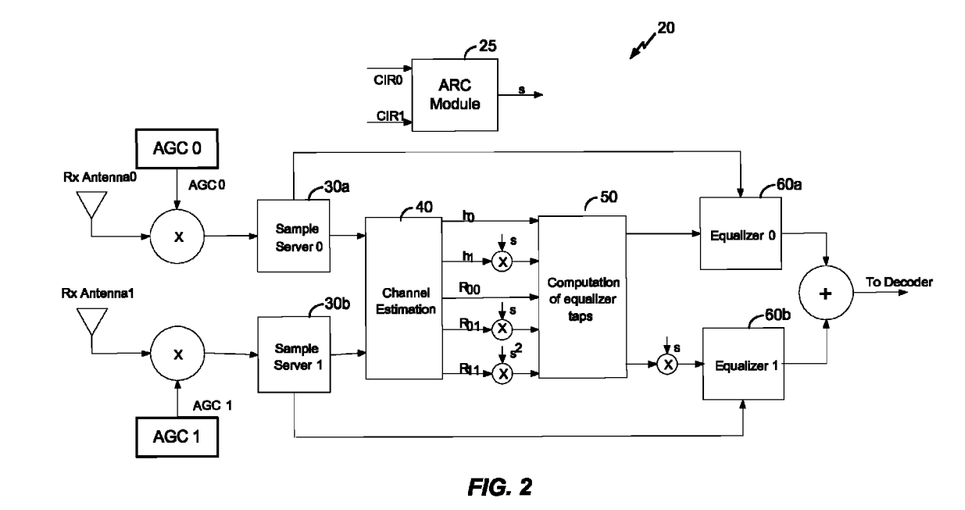
FIG. 2 is a block diagram illustrating an example of a diversity W-CDMA receiver having an ARC module according to one aspect.
Figure 3:
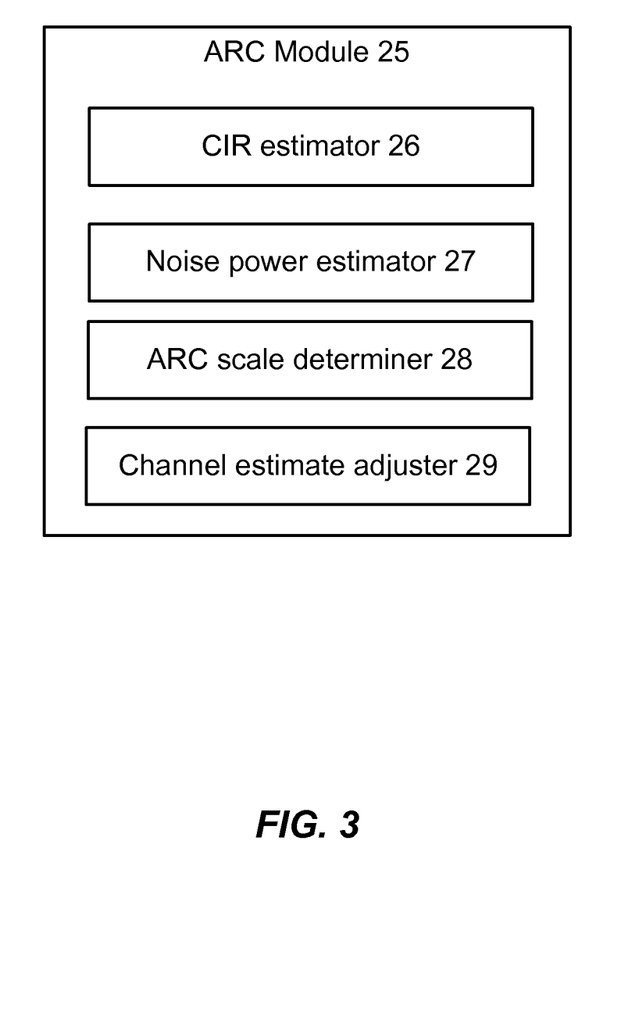
FIG. 3 is a block diagram illustrating an example of the ARC module according to one aspect.

FIGS. 2 and 3 illustrate an example implementation of an adaptive RxD combining (ARC) module and the manner in which it is integrated in the diversity receiver of FIG. 1. As shown in FIG. 3, the ARC module 25 may include a channel impulse response (CIR) estimator 26, a noise power estimator 27, an ARC scale determiner 28 and a channel estimate adjuster 29. The CIR estimator 26 may obtain channel impulse response estimates for each Rx chain from the pilot or CPICH channel received by UE from Node B. The CIR estimator 26 passes the CIR estimates for each receiver to the noise power estimator 27. The estimator 27 determines noise power estimates for each receiver based on the CIR estimates. The ARC scale determiner 28 determines an appropriate scaling factor "s" for each receiver chain based on the noise power estimates for each receiver chain. As shown in FIG. 2, the scaling factor s generated by the ARC module 25 (output s) is used to adjust channel estimate parameters and equalizer taps (inputs s). For example, at any time instant, the Rx chain with lower post-AGC noise power may be assigned a weight of 1 and Rx chain with higher post-AGC noise power may be assigned a weight of s<1. Once the appropriate scaling factors for each receiver chain have been determined, the channel estimate adjuster 29 scales the channels estimates provided by the channel estimator 40 by the appropriate scaling factors, as show in FIG. 2. Particularly, the channel estimate adjuster 29 scales down the channel estimates for Rx chain with higher post-AGC noise power, as illustrated in FIG. 3.

In one aspect, the ARC module 25 may implement the following algorithm:

At every update instant of equalizers 60a and 60b,
For each receiver chain (Rx),
$e(n) = |CIR(n) - PreviousCIR(n)|^2$, where n is the tap index
$\phi(n) = $ Filter $\{e(n)\}$
$m = \arg\max_n |FilteredCIR(n)|^2$
$noise\_est(Rx) = \phi(m)/|FilteredCIR(m)|^2$
Compute:
$\rho = sqrt\{noise\_est(Rx1)/noise\_est(Rx0)\}$
If $\rho > 1$,
   chosenRx=1
   ARC scale (s)=$1/\rho$
Else
   chosenRx=0
   ARC scale (s)=$\rho$ Note that the above is an exemplary implementation of how post-AGC noise variance on each Rx chain could be computed and used for adaptive RxD combining Several minor variations can be envisioned within the above framework. For instance, the filter used to generate $\phi(n)$ from $e(n)$ could be an FIR filter, an IIR filter, or a combination thereof. The noise power estimate (noise_est) need not necessarily be computed from the strongest tap of the CIR. It could be obtained from a linear combination (e.g. power weighted combination) across multiple CIR taps. In fact, the noise power estimate could be generated from RAKE finger statistics (commonly available on WCDMA receivers) and need not rely on the CIR estimate at all. Finally, in one aspect, the equalizer update rate could be chosen arbitrarily, depending upon desired performance and acceptable complexity of the receiver system.

Once ARC scale factor s has been computed, it may be used as follows to compute the MMSE equalizer taps by the equalizer tap computation module 50.

If chosenRx=1,
   Scale $\vec{h}_1$ by s, i.e., $\vec{h}_1' = s\vec{h}_1$
   Scale $R_{01}$ by s, i.e., $R_{01}' = sR_{01}$
   Scale $R_{11}$ by $s^2$, i.e., $R_{11}' = s^2 R_{11}$ Compute the MMSE taps as follows:

$$\vec{c}'_{MMSE} = \begin{bmatrix} \vec{c}'_0 \\ \vec{c}'_1 \end{bmatrix} = \left( \underbrace{\begin{bmatrix} R_{00} & (R'_{01})^H \\ R'_{01} & R'_{11} \end{bmatrix}}_{R'} + \lambda I \right)^{-1} \underbrace{\begin{bmatrix} \vec{h}^*_0 \\ (\vec{h}'_1)^* \end{bmatrix}}_{h'} \quad \text{Equation 8}$$

Scale the MMSE taps for Rx 1 by s, i.e., $\vec{c}_1'' = s\vec{c}_1'$

Use the taps $\vec{c}_0'$ and $\vec{c}_1''$ to equalize the signals received on Rx 0 and Rx 1, respectively If chosenRx=0, Scale $\vec{h}_0$ by s, i.e., $\vec{h}_0' = s\vec{h}_0$
Scale $R_{01}$ by s, i.e., $R_{01}' = sR_{01}$
Scale $R_{00}$ by $s^2$, i.e., $R_{00}' = s^2 R_{00}$
Compute the MMSE taps as follows:

$$\vec{c}'_{MMSE} = \begin{bmatrix} \vec{c}'_0 \\ \vec{c}'_1 \end{bmatrix} = \left( \underbrace{\begin{bmatrix} R'_{00} & (R'_{01})^H \\ R'_{01} & R_{11} \end{bmatrix}}_{R'} + \lambda I \right)^{-1} \underbrace{\begin{bmatrix} (\vec{h}'_0)^* \\ \vec{h}^*_1 \end{bmatrix}}_{h'} \quad \text{Equation 9}$$

Scale the MMSE taps for Rx 0 by s, i.e., $\vec{c}_0'' = s\vec{c}_0'$

Use taps $\vec{c}_0''$ and $\vec{c}_0'$ to equalize the signals received on Rx0 and Rx1, respectively.

Figure 4:
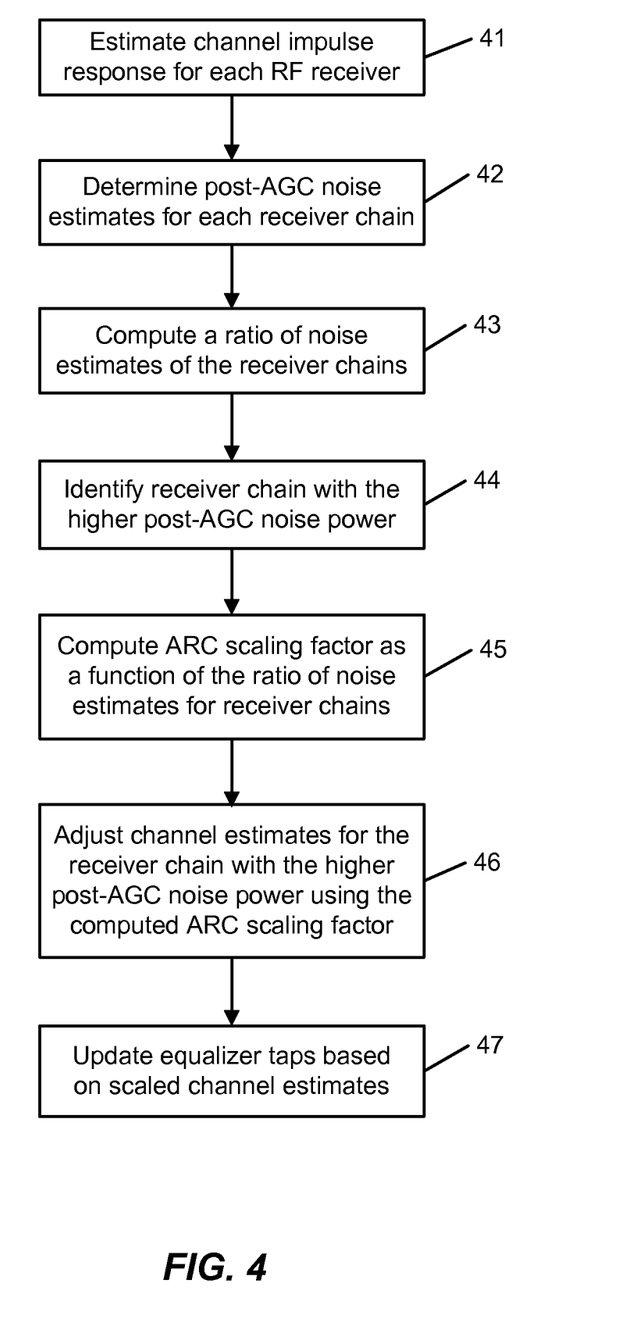
FIG. 4 is a flow diagram illustrating an example of the ARC methodology according to one aspect.

FIG. 4 illustrates an example ARC methodology implemented in ARC module in a diversity W-CDMA UE receiver (such as ARC module 25 of UE receiver 20 of FIG. 2) according to one aspect. At step 41, the ARC module estimates channel impulse responses for each receiver chain of the UE. At step 42, the ARC module determines post-AGC noise power estimates for each receiver chain. At step 43, the ARC module computes ratio of noise power estimates for receiver chains. At step 44, the ARC module identifies receiver chain with the higher post-AGC noise power. At step 45, the ARC module computes ARC scaling factor s as a function of the ratio of noise estimates for each receiver chain. At step 46, the ARC module adjusts channel estimates for the receiver chain with the higher post-AGC noise power using the computed ARC scaling factor s. Finally, at step 47, the equalizer tap computation module updates equalizer taps based on the scaled channel estimates.

While the ARC algorithm described above relies on scaling the CIR and covariance metrics for the Rx chain with higher noise power by scale factor s, a similar effect can be achieved by doing adaptive conditioning on the diagonal of the covariance matrix according to another aspect of the invention. Specifically, the MMSE equalizer taps with adaptive conditioning may be computed using the following equation:

$$\vec{c}_{MMSE-AdaptCond} = (R+\Lambda)^{-1} \vec{h} \quad \text{Equation 10}$$

where $\Lambda$ is a diagonal matrix of the form $$\Lambda = \begin{bmatrix} \lambda_0 I & 0 \\ 0 & \lambda_1 I \end{bmatrix}$$

and $\lambda_0, \lambda_1 > 0$ are computed as follows:
If chosenRx=1, then $\lambda_0 = \lambda$, $\lambda_1 = \lambda\rho^2$, where $\rho = \text{sqrt}\{\text{noise\_est}(Rx1)/\text{noise\_est}(Rx0)\}$
If chosenRx=0, then $\lambda_0 = \lambda\rho^2$, $\lambda_1 = \lambda$, where $\lambda$ is a design parameter.

Figure 5:
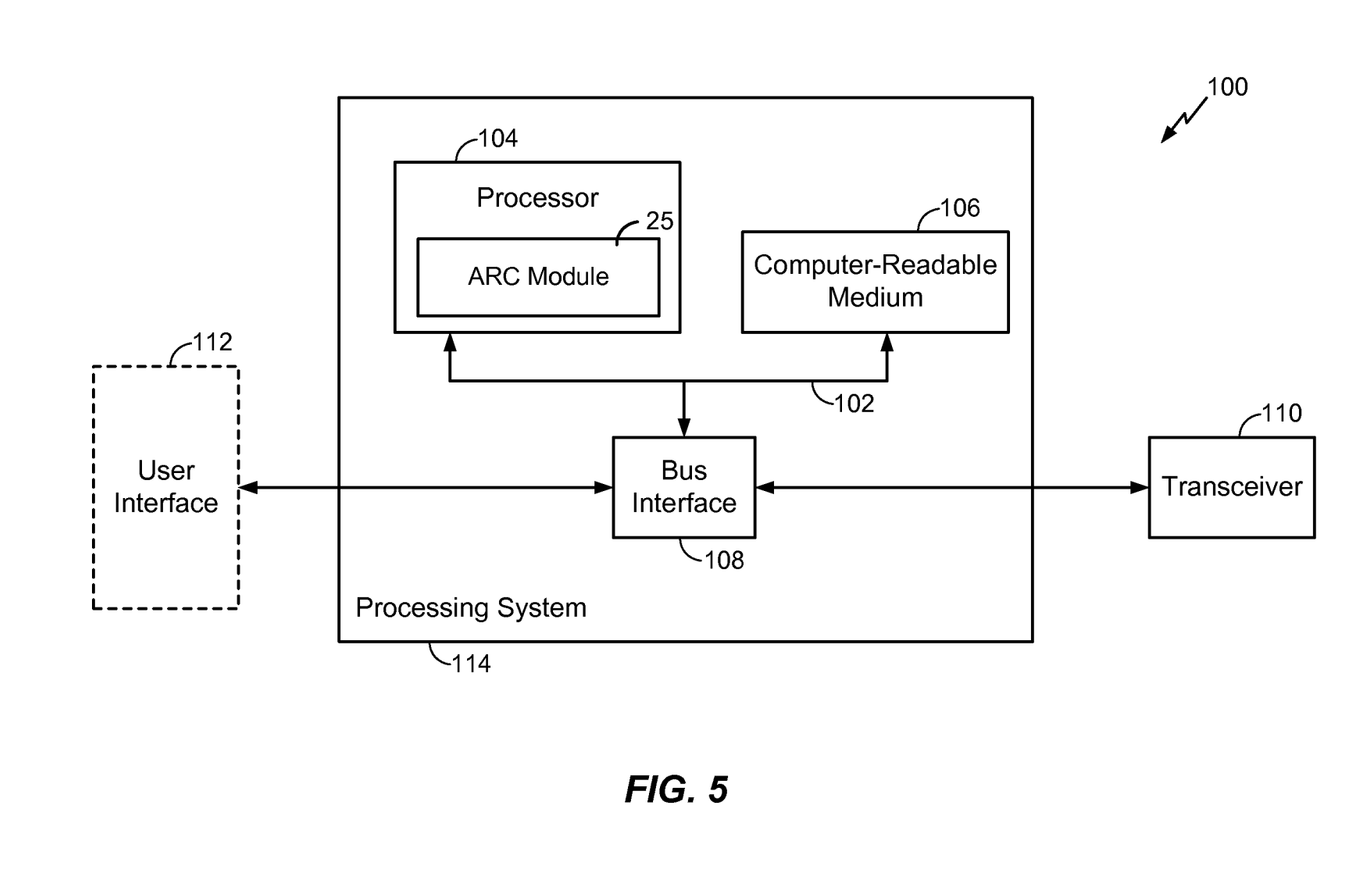
FIG. 5 is a block diagram illustrating an example of a hardware implementation for a UE employing a processing system that implements the ARC methodology.

FIG. 5 is a block diagram illustrating an example of a hardware implementation for an apparatus 100, such as a UE, employing a processing system 114. The apparatus 100 may be, for example, UE 20 of FIG. 2 and accordingly implement the methods and systems of FIGS. 2-4. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. In one aspect, the processing 104 may includes ARC module 25, which can be implemented as a set of instructions. The computer-readable medium 106 may also be used for storing data that is manipulated by the processor 104 when executing software.

Figure 6:
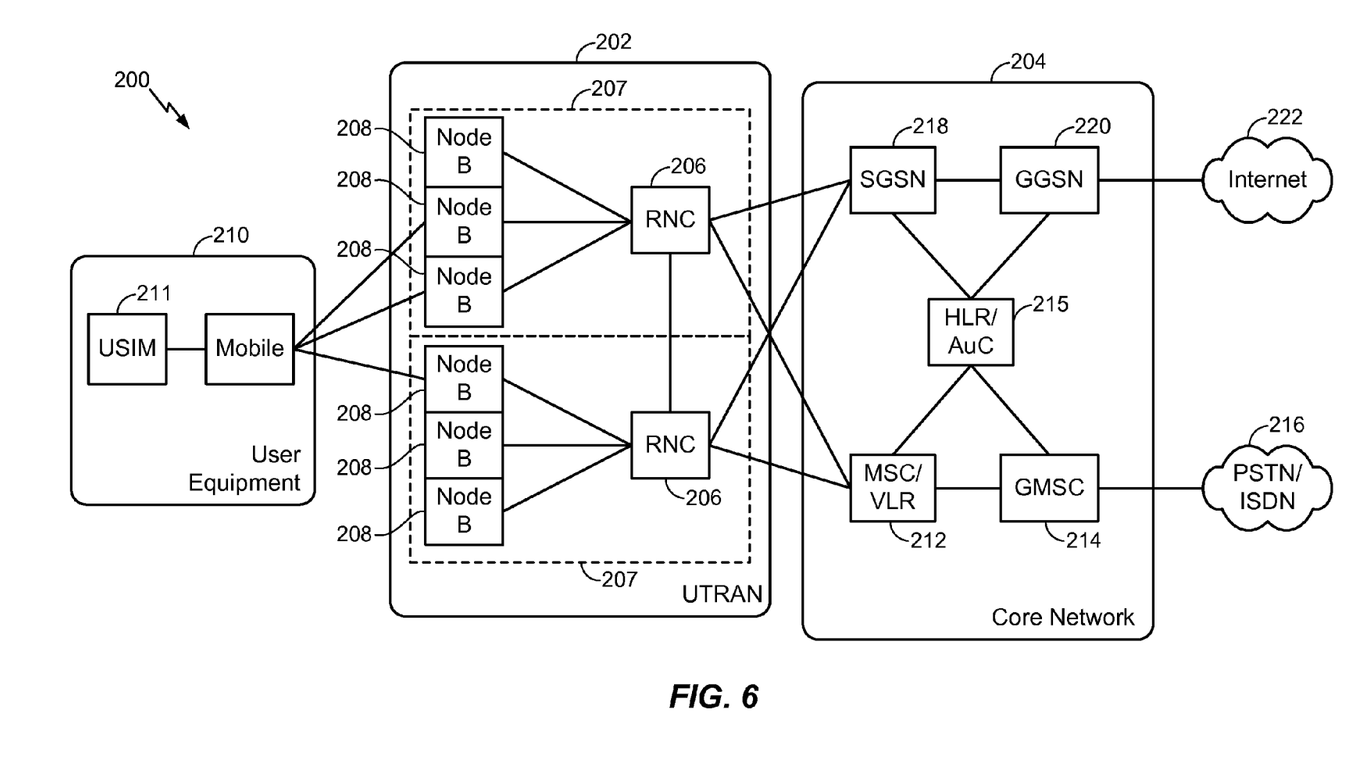
FIG. 6 is a block diagram conceptually illustrating an example of a telecommunications system that implements the ARC methodology in UE.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be, for example, UE 20 of FIG. 2 and accordingly implement the methods and systems of FIGS. 2-4. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210. Examples of the UE 210 include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may be commonly referred to by those skilled in the art as a mobile apparatus, mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology.

The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
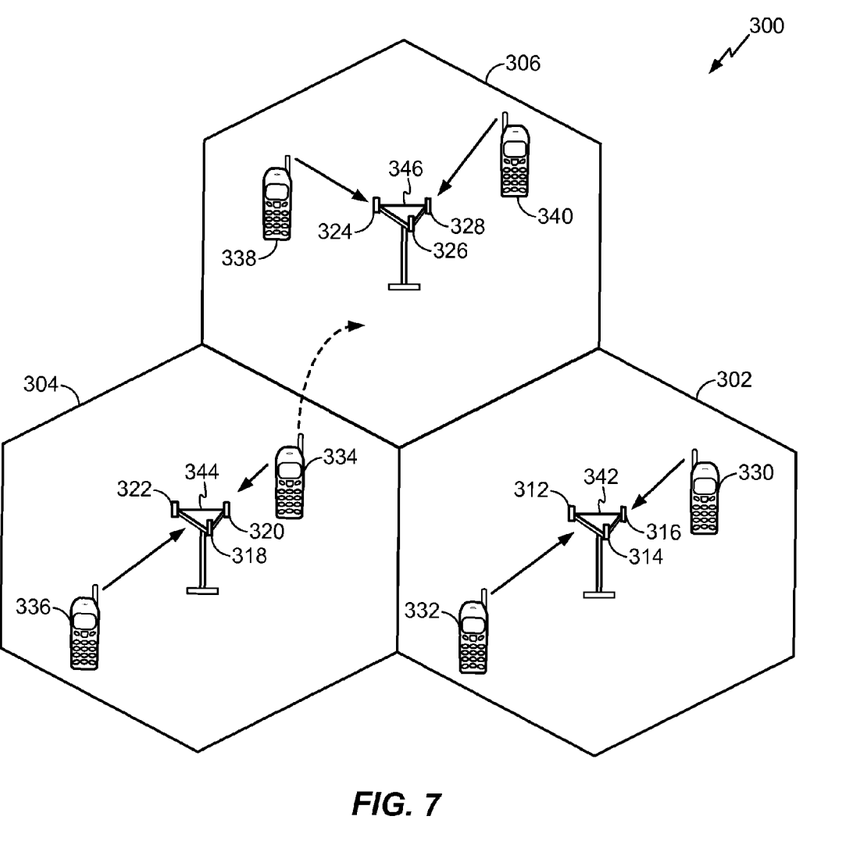
FIG. 7 is a conceptual diagram illustrating an example of an access network.

Referring to FIG. 7, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306. One or more or all of UEs 330, 332, 334, 336, 338, 340 may be UEs such as, e.g., UE 20 of FIG. 2 and accordingly implement the methods and systems of FIGS. 2-4.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
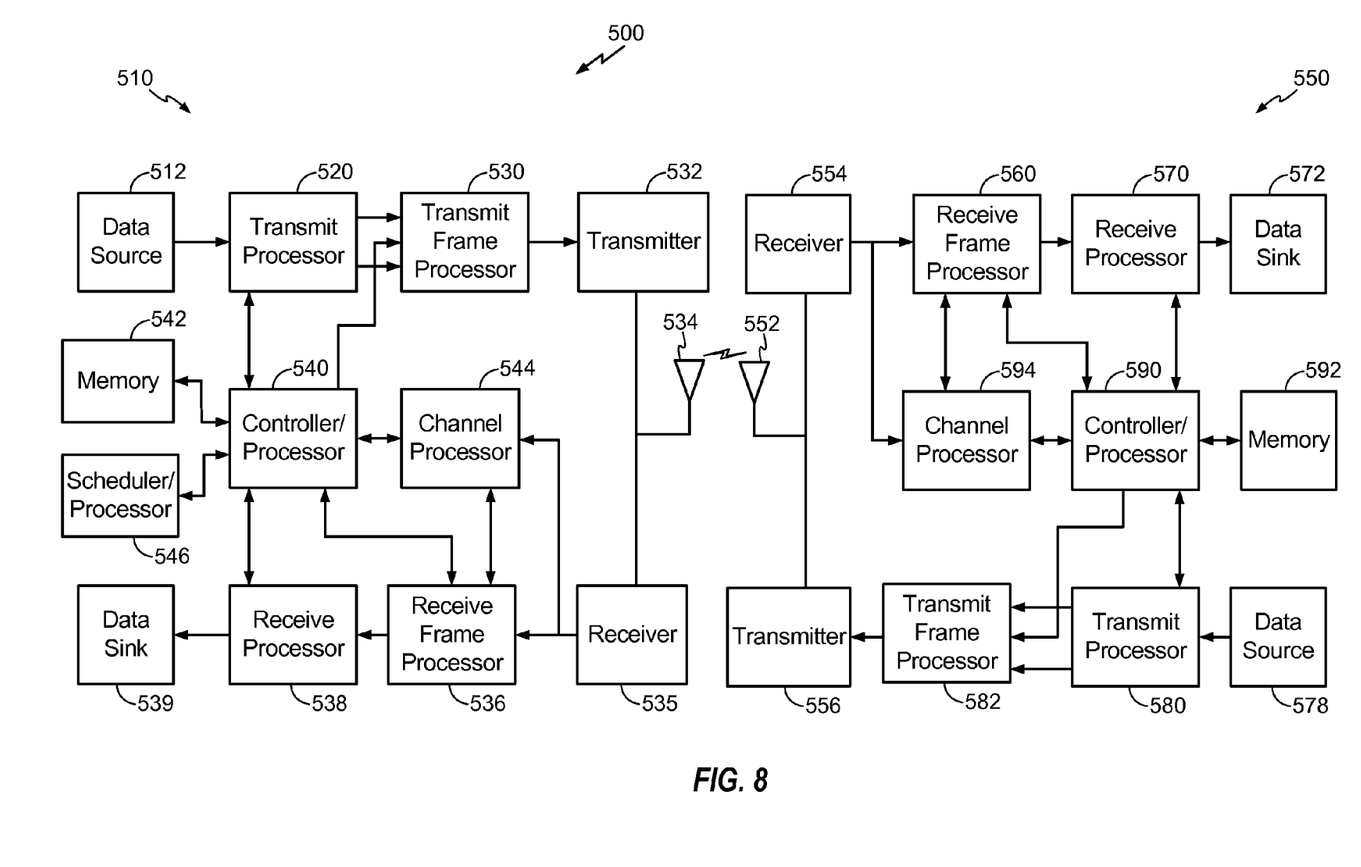
FIG. 8 is a block diagram conceptually illustrating an example of a Node B in communication with a UE in a telecommunications system.

FIG. 8 is a block diagram of a Node B 510 in communication with a UE 550, where the Node B 510 may be the Node B 208 in FIG. 6, and the UE 550 may be the UE 20 in FIG. 2 and accordingly implement the methods and systems of FIGS. 2-4. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/ or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for initializing an equalizer in a diversity receiver, the method comprising:
   estimating a channel impulse response (CIR) for each receiver chain of the diversity receiver;
   processing a signal from each receiver chain using a respective automatic gain control (AGC) for each receiver chain;
   determining post-AGC noise power estimates for each receiver chain based on the CIRs and the processed signals; and
   adaptively adjusting equalizer taps of each receiver chain based on the post-AGC noise power estimates, wherein the adaptively adjusting the equalizer taps includes computing the equalizer taps using an inversion of a received signal covariance matrix, wherein:
      the inversion of the received signal covariance matrix comprises adding a positive term to a diagonal of the received signal covariance matrix;
      the positive term is a product of a conditioning coefficient and a sum of the diagonal of the received signal covariance matrix; and
      the condition coefficient has a value that is greater than zero and less than or equal to 1.

2. The method of claim 1, wherein the adaptively adjusting equalizer taps of each receiver chain of the diversity receiver further comprises:
   determining channel estimates for each receiver chain of the diversity receiver;
   computing a ratio of the noise power estimates of the receiver chains;
   computing a scaling factor as a function of the ratio of noise power estimates;
   identifying a receiver chain with a higher noise power estimate;
   scaling channel estimates for the receiver chain with the higher noise power using the computed scaling factor; and
   computing equalizer taps of each receiver chain based on the scaled channel estimates.

3. The method of claim 2, wherein the determining channel estimates for each receiver chain includes determining covariance metrics for each receiver chain of the diversity receiver, and wherein the scaling channel estimates includes:
   scaling the CIR and covariance metrics for the receiver chain with the higher noise power by the scaling factor.

4. The method of claim 2, wherein the computing equalizer taps includes computing a linear minimum mean squared error (LMMSE) chip level function of the equalizer.

5. The method of claim 2, wherein the channel impulse response estimates for each receiver chain are obtained from one of a pilot signal or common pilot channel (CPICH).

6. The method of claim 1, wherein the adaptively adjusting equalizer taps of each receiver chain of the diversity receiver further comprises:
   performing adaptive conditioning on the diagonal of the received signal covariance matrix of the equalizer taps.

7. An apparatus for wireless communication, comprising:
   at least one processor configured to:
      estimate a channel impulse response (CIR) for each receiver chain of a diversity receiver;
      process a signal from each receiver chain using a respective automatic gain control (AGC) for each receiver gain;
      determine post-AGC noise power estimates for each receiver chain based on the CIRs and the processed signals; and adaptively adjust equalizer taps of each receiver chain based on the post-AGC noise power estimates, wherein to adaptively adjust the equalizer taps includes to compute the equalizer taps using an inversion of a received signal covariance matrix, wherein:
the inversion of the received signal covariance matrix comprises adding a positive term to a diagonal of the received signal covariance matrix;
the positive term is a product of a conditioning coefficient and a sum of the diagonal of the received signal covariance matrix; and
the condition coefficient has a value that is greater than zero and less than or equal to 1.

8. The apparatus of claim 7, wherein to adaptively adjust equalizer taps of each receiver chain of the diversity receiver, the processor further configured to:
determine channel estimates for each receiver chain of the diversity receiver;
compute a ratio of the noise power estimates of the receiver chains;
compute a scaling factor as a function of the ratio of noise power estimates;
identify a receiver chain with a higher noise power estimate;
scale channel estimates for the receiver chain with the higher noise power using the computed scaling factor; and
compute equalizer taps of each receiver chain based on the scaled channel estimates.

9. The apparatus of claim 8, wherein the channel estimates determination for each receiver chain includes determining covariance metrics for each receiver chain of the diversity receiver, and wherein to scale channel estimates, the processor further configured to:
scale the CIR and covariance metrics for the receiver chain with the higher noise power by the scaling factor.

10. The apparatus of claim 8, wherein to compute equalizer taps, the processor further configured to compute a linear minimum mean squared error (LMMSE) chip level function of the equalizer.

11. The apparatus of claim 8, wherein the channel impulse response estimates for each receiver chain are obtained from one of a pilot signal or common pilot channel (CPICH).

12. The apparatus of claim 7, wherein to adaptively adjust equalizer taps of each receiver chain of the diversity receiver, the processor further configured to:
perform adaptive conditioning on the diagonal of the received signal covariance matrix of the equalizer taps.

13. An apparatus for initializing an equalizer in a diversity receiver, comprising:
means for estimating a channel impulse response (CIR) for each receiver chain of the diversity receiver;
means for processing a signal from each receiver chain using a respective automatic gain control (AGC) for each receiver chain;
means for determining post-AGC noise power estimates for each receiver chain based on the CIRs and the processed signals; and
means for adaptively adjusting equalizer taps of each receiver chain based on the post-AGC noise power estimates, wherein the adaptively adjusting the equalizer taps includes computing the equalizer taps using an inversion of a received signal covariance matrix, wherein:
the inversion of the received signal covariance matrix comprises adding a positive term to a diagonal of the received signal covariance matrix;
the positive term is a product of a conditioning coefficient and a sum of the diagonal of the received signal covariance matrix; and
the condition coefficient has a value that is greater than zero and less than or equal to 1.

14. The apparatus of claim 13, wherein means for adaptively adjusting equalizer taps of each receiver chain of the diversity receiver further include:
means for determining channel estimates for each receiver chain of the diversity receiver;
means for computing a ratio of the noise power estimates of the receiver chains;
means for computing a scaling factor as a function of the ratio of noise power estimates;
means for identifying a receiver chain with a higher noise power estimate;
means for scaling channel estimates for the receiver chain with the higher noise power using the computed scaling factor; and
means for computing equalizer taps of each receiver chain based on the scaled channel estimates.

15. The apparatus of claim 14, wherein the means for determining channel estimates for each receiver chain determines covariance metrics for each receiver chain of the diversity receiver, and wherein the means for scaling channel estimates includes:
means for scaling the CIR and covariance metrics for the receiver chain with the higher noise power by the scaling factor.

16. The apparatus of claim 14, wherein the means for computing equalizer taps includes means for computing a linear minimum mean squared error (LMMSE) chip level function of the equalizer.

17. The apparatus of claim 14, wherein the channel impulse response estimates for each receiver chain are obtained from one of a pilot signal or common pilot channel (CPICH).

18. The apparatus of claim 13, wherein the means for adaptively adjusting equalizer taps of each receiver chain of the diversity receiver further comprises:
performing adaptive conditioning on the diagonal of the received signal covariance matrix of the equalizer taps.

19. A non-transitory computer-readable medium comprising codes for:
estimating a channel impulse response (CIR) for each receiver chain of a diversity receiver;
processing a signal from each receiver chain using a respective automatic gain control (AGC) for each receiver chain;
determining post-AGC noise power estimates for each receiver chain based on the CIRs and the processed signals; and
adaptively adjusting equalizer taps of each receiver chain based on the post-AGC noise power estimates, wherein the adaptively adjusting the equalizer taps includes computing the equalizer taps using an inversion of a received signal covariance matrix, wherein:
the inversion of the received signal covariance matrix comprises adding a positive term to a diagonal of the received signal covariance matrix;
the positive term is a product of a conditioning coefficient and a sum of the diagonal of the received signal covariance matrix; and
the condition coefficient has a value that is greater than zero and less than or equal to 1.

20. The medium of claim 19, wherein the adaptively adjusting equalizer taps of each receiver chain of the diversity receiver further comprises:

determining channel estimates for each receiver chain of the diversity receiver;

computing a ratio of the noise power estimates of the receiver chains;

computing a scaling factor as a function of the ratio of noise power estimates;

identifying a receiver chain with a higher noise power estimate;

scaling channel estimates for the receiver chain with the higher noise power using the computed scaling factor; and computing equalizer taps of each receiver chain based on the scaled channel estimates.

21. The medium of claim 20, wherein determining channel estimates for each receiver chain includes determining covariance metrics for each receiver chain of the diversity receiver, and wherein the scaling channel estimates includes:

scaling the CIR and covariance metrics for the receiver chain with the higher noise power by the scaling factor.

22. The medium of claim 20, wherein the computing equalizer taps includes computing a linear minimum mean squared error (LMMSE) chip level function of the equalizer.

23. The medium of claim 20, wherein the channel impulse response estimates for each receiver chain are obtained from one of a pilot signal or common pilot channel (CPICH).

24. The medium of claim 19, wherein the adaptively adjusting equalizer taps of each receiver chain of the diversity receiver further comprises:

performing adaptive conditioning on the diagonal of a received signal covariance matrix of the equalizer taps.

* * * * *